United States Patent
Wang et al.

(10) Patent No.: US 11,113,776 B1
(45) Date of Patent: *Sep. 7, 2021

(54) SYSTEMS AND METHODS FOR PROTECTING USER IDENTITY WITHIN ONLINE CONTENT PROVIDING ENVIRONMENTS

(71) Applicant: Google LLC, Mountain View, CA (US)

(72) Inventors: Gang Wang, Jersey City, NJ (US); Matthew Young-Lai, Kitchener (CA); Zoltan Szamonek, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,961

(22) Filed: Aug. 15, 2019

Related U.S. Application Data

(63) Continuation of application No. 14/480,063, filed on Sep. 8, 2014, now Pat. No. 10,424,034.

(51) Int. Cl.
*G06Q 30/00* (2012.01)
*G06Q 50/26* (2012.01)
*G06Q 30/02* (2012.01)
*G06F 21/62* (2013.01)

(52) U.S. Cl.
CPC ....... *G06Q 50/265* (2013.01); *G06F 21/6263* (2013.01); *G06Q 30/0275* (2013.01)

(58) Field of Classification Search
CPC .............. G06Q 50/265; G06Q 30/0275; G06F 21/6263
See application file for complete search history.

(56) References Cited

U.S. PATENT DOCUMENTS

| | | | |
|---|---|---|---|
| 6,618,757 | B1 | 9/2003 | Babbitt |
| 7,246,231 | B2 | 7/2007 | Tariq et al. |
| 8,725,570 | B2 | 5/2014 | Doughty et al. |
| 8,825,662 | B1 | 9/2014 | Kingman |
| 2004/0071149 | A1 | 4/2004 | Kim |
| 2004/0114558 | A1 | 6/2004 | Krishnamurthi |
| 2006/0146813 | A1 | 7/2006 | Biswas |
| 2011/0103394 | A1 | 5/2011 | Vogt |
| 2011/0161172 | A1 | 6/2011 | Lee |
| 2013/0325607 | A1 | 12/2013 | Delug |
| 2014/0095324 | A1 | 4/2014 | Cabral |
| 2014/0129351 | A1 | 5/2014 | Ringdahl |

(Continued)

OTHER PUBLICATIONS

Wikipedia, "Ipv4." Retrieved from the Internet: <URL: https://en.wikipedia.org/wiki/IPv4>, Aug. 14, 2013, 11 pages.

(Continued)

*Primary Examiner* — Yehdega Retta
(74) *Attorney, Agent, or Firm* — Fish & Richardson P.C.

(57) ABSTRACT

A computer-implemented method for protecting user identity within online content providing environments uses a security content management system (CMS) including at least one processor and a memory. The method includes identifying a request for an online content item associated with an online device. The online device is associated with actual device data. The method also includes determining a first characteristic value associated with the actual device data of the online device. The method further includes generating, by the processor, substitute device data. The substitute device data represents at least the first characteristic value. The method also includes providing the substitute device data to an online content provider.

19 Claims, 5 Drawing Sheets

(56) References Cited

U.S. PATENT DOCUMENTS

2014/0357300 A1    12/2014  Hao
2015/0257142 A1     9/2015  Ueda

OTHER PUBLICATIONS

Wikipedia, "Ipv6." Retrieved from the Internet: <URL: https://en.wikipedia.org/wiki/IPv6>, Aug. 14, 2013, 11 pages.
Wikipedia, "SHA-2." Retrieved from the Internet: <URL:https://en.wikipedia.org/wiki/SHA-2>, Jul. 27, 2013, 10 pages.
Wikipedia, "User agent," <URL: https://en.wikipedia.org/wiki/User_agent>, 4 pages.

SYSTEMS AND METHODS FOR PROTECTING USER IDENTITY WITHIN ONLINE CONTENT PROVIDING ENVIRONMENTS

CROSS-REFERENCE TO RELATED APPLICATIONS

This is a continuation of U.S. patent application Ser. No. 14/480,063, filed on Sep. 8, 2014. The disclosure of the prior application is considered part of and is incorporated by reference in the disclosure of this application.

BACKGROUND

This specification relates to presenting online content to a user and, more particularly, to a system and method for protecting user identity within an online content providing environment.

Internet users and other consumers of online content are presented with publications such as a news article on a publisher's a web page. This primary content may also be presented alongside one or more online content items such as online advertisements. In some known systems, online content providers (e.g., advertisers) evaluate individual requests for online content items and may optionally provide online content (e.g., advertisements) to some requests. For example, an online user may browse to a web site that contains an advertisement space available for an online content item. The web site may query a content management system (CMS) to provide an online content item, and the CMS may offer this space to one or more online content providers.

In some known systems, the CMS may provide information about the online user to one or more online content providers. The online content providers may utilize this data to value whether or not the requesting user device is appropriate for particular products or services offered by the online content providers. One of the data items commonly provided to online content providers as part of the online content request is a device IP address. From the IP address, online content providers may be able to determine some data about the user device that may influence their advertising decision. For example, online content providers may be able to determine characteristics of the actual IP address such as (i) approximate geo-location of the device, (ii) which Internet Service Provider (ISP) the device is affiliated with, and/or (iii) the connection type/speed of the device. However, presenting the device's actual IP address to the online content bidders may present some privacy and/or security concerns for some users.

BRIEF DESCRIPTION OF THE DISCLOSURE

In one aspect, a computer-implemented method for protecting user identity within online content providing environments is provided. The method uses a security content management system (CMS) including at least one processor and a memory. The method includes identifying a request for an online content item associated with an online device. The online device is associated with actual device data. The method also includes determining a first characteristic value associated with the actual device data of the online device. The method further includes generating, by the processor, substitute device data. The substitute device data represents at least the first characteristic value. The method also includes providing the substitute device data to an online content provider.

In another aspect, a security content management computer system (CMS) for protecting user identity within online content providing environments is provided. The security CMS includes an output device, at least one memory, and at least one processor. The at least one processor is configured to identify a request for an online content item associated with an online device. The online device is associated with actual device data. The at least one processor is also configured to determine a first characteristic value associated with the actual device data of the online device. The at least one processor is further configured to generate substitute device data. The substitute device data represents at least the first characteristic value. The at least one processor is also configured to provide the substitute device data to an online content provider.

In yet another aspect, computer-readable storage media having computer-executable instructions embodied thereon are provided. When executed by at least one processor, the computer-executable instructions cause the at least one processor to identify a request for an online content item associated with an online device. The online device is associated with actual device data. The computer-executable instructions also cause the at least one processor to determine a first characteristic value associated with the actual device data of the online device. The computer-executable instructions further cause the at least one processor to generate substitute device data. The substitute device data represents at least the first characteristic value. The computer-executable instructions also cause the at least one processor to provide the substitute device data to an online content provider.

BRIEF DESCRIPTION OF THE DRAWINGS

FIG. 1 is a diagram showing an example networked environment for enabling privacy protection features while providing online content to users.

FIG. 2 is a block diagram of a computing device that may be used for enabling privacy protection features while providing online content to users in the networked environment shown in FIG. 1.

FIG. 3 is a diagram showing an example environment shown in FIG. 1 in which an online user of a computing device shown in FIG. 2 generates a request for online content.

FIG. 4 is an example method for protecting user identity within online content providing environment shown in FIG. 1.

FIG. 5 shows an example configuration of a database within a computing device, along with other related computing components, that may be used to protect user identity within online content providing environments.

Like reference numbers and designations in the various drawings indicate like elements.

DETAILED DESCRIPTION OF THE DISCLOSURE

Figure 1:
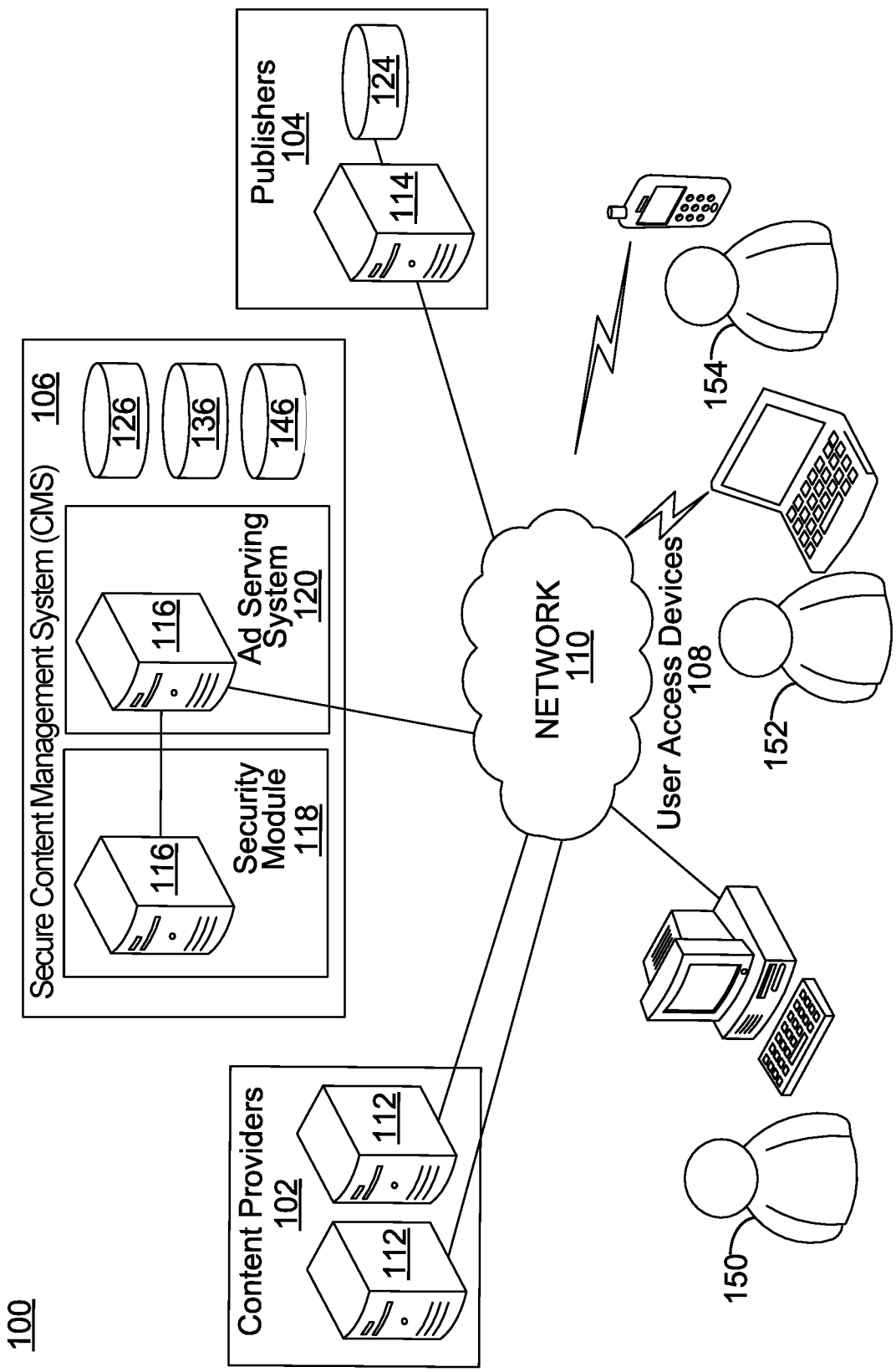
FIGS. 1-5 show example embodiments of the methods and systems described herein.

Embodiments of the methods and systems described herein enable aspects of privacy protection of online users to online content providers. In some embodiments, a provider of online content (e.g., an advertiser) optionally considers whether or not to provide online content (e.g., an advertisement) to a user device in an online venue (e.g., a web page, a mobile app, or other online service). For example, the online content provider may participate in a real-time bidding process (e.g., an "ad auction") hosted by a secured content management system (CMS). The auction may be conducted in real time, for example, during a request for web page content that includes an ad space for an online content item.

In the systems and methods described herein, the security CMS is configured to receive actual device data (e.g. the "actual IP address" of the requesting user device), generate substitute device data (e.g., a "substitute IP address") having one or more characteristics that are shared with the actual device data, and provide the substitute device data to online content providers (e.g., third parties such as advertisers in an auction environment, sometimes referred to herein as bidders, or "real-time bidders" (RTB's)). Thus, the information required by the RTB's for serving relevant ads to the requesting user device is provided to the RTB's through the substitute device data while still protecting the actual user device data of the requesting user device.

More specifically, to ensure that bidders are still able to determine at least some characteristics of the device, the system carefully selects substitute device data sharing the same characteristics of the actual device data. For example, and using IP address as the example actual data, the security CMS selects a substitute IP address, or a "pseudo-IP address," having one or more characteristics that are shared with the actual IP address. For example, presume the actual IP address of the device can be approximately geo-located near Palo Alto, Calif. The security CMS identifies a pool of IP addresses based on the characteristic type of "geo-location" that have the same characteristic value of Palo Alto, Calif. From this pool, the security CMS generates an IP address (e.g., randomly from a pool of IP addresses sharing one or more characteristics) as the substitute address to provide to one or more bidders during an auction for an online ad involving this device. As such, the bidders do not receive the actual IP address of the device (protecting some aspects of the user's privacy), but the bidders still have access to some of the data that is important to them for purposes of bidding (e.g., a substitute IP address from which they can determine a geo-location of the actual IP address).

In some embodiments, the security CMS maintains a mapping of the actual device data to the substitute device data that was generated. As such, the security CMS may provide the same substitute data (e.g., the same substitute IP address) to the bidders during later auctions. This allows bidders to uniquely identify devices for some period of time, though still without the actual device data. In some embodiments, the system deletes and reselects (re-maps) new substitute data (e.g., substitute IP addresses) for devices on some pre-determined basis, such as every week or month. In other embodiments, bidders are able to identify the data characteristics ("characteristic types") that matter to them, and the substitute data selected for that device will match at least all of those selected characteristic types.

The methods and systems described herein may be implemented using computer programming or engineering techniques including computer software, firmware, hardware, or any combination or subset thereof, wherein the technical effects may be achieved by performing at least one of the following steps: (a) identifying a request for an online content item associated with an online device, wherein the online device is associated with actual device data; (b) determining a first characteristic value associated with the actual device data of the online device; (c) generating, by the processor, substitute device data, wherein the substitute device data represents at least the first characteristic value; (d) providing the substitute device data to an online content provider; (e) wherein the actual device data includes at least an actual internet protocol (IP) address associated with the online device, wherein generating substitute device data further includes selecting a substitute IP address; (f) wherein the substitute IP address is one of a complete IP version 4 (IPv4) address and a complete IP version 6 (IPv6) address; (g) wherein the online content item is an online advertisement, wherein the online content provider is a real-time bidder in an auction associated with the request, wherein providing the substitute device data includes providing the substitute device data during the auction; (h) receiving, from the online content provider, identification of a first characteristic type used by the online content provider, wherein the first characteristic type identifies a characteristic type which the substitute device data is to share with the actual device data, wherein determining a first characteristic value includes determining a first characteristic value for the first characteristic type; (i) wherein determining a first characteristic of the actual device data includes determining the first characteristic having a characteristic type of one of (i) geo-location of the actual device data, (ii) internet service provider associated with the actual device data, and (iii) a connection characteristic associated with the actual device data; (i) storing, in the memory, a mapping of the actual device data to the substitute device data; (j) identifying another request for another online content item involving a later online content provider and the online user; (k) identifying, from the memory, the substitute device data based at least in part on the actual device data; (l) providing the substitute device data to the later online content provider in response to the other request; (m) determining that a predetermined expiration time has elapsed since storing the mapping; (n) deleting the mapping of the actual device data to the substitute device data; (o) identifying a pool of substitute device data having the first characteristic; and (p) selecting a random substitute device data from the pool of substitute device data, thereby generating the substitute device data.

The following detailed description illustrates embodiments of the disclosure by way of example and not by way of limitation. It is contemplated that the disclosure has general application to the presentation and valuation of content items such as online advertisements during presentation of publications such as online web pages.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

FIG. 1 is a diagram showing an example networked environment for enabling privacy protection features while providing relevant online content to users. With reference to FIG. 1, an example networked environment 100 may include one or more content providers 102 (alternatively referred to herein as merchants), one or more publishers 104, a security content management system (CMS) 106, and one or more user access devices 108 ("client computing devices" or just "client devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with servers, software processes and engines, and/or various embedded systems. The elements 102, 104, 106 and 110 may serve, for example, as a content bidding and distribution network. In the example embodiment, content providers 102 include online advertisers, and security CMS 106 is an online advertising management system that enables privacy protection features for users 150, 152, and 154 (e.g., the consumers of online content).

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts. In some embodiments, content providers 102 provide content items that include, for example, audio and/or video advertisements.

Content may be communicated via various mediums and in various forms. In some examples, content may be communicated through an interactive medium, such as the Internet, and may include graphical content (e.g., banner content), textual content, image content, audio content, video content, content combining one or more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression, also referred to herein as an advertisement, or "ad." A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

In some embodiments, one or more ads are affiliated with an "ad group." An ad group includes one or more ads along with other associated information related to those ads, such as, for example and without limitation, a title, a headline, a budget, targeting criteria, and keywords. In the example embodiment, an ad group includes one ad and associated information. As used herein, the term "ad" and "ad group" may be used interchangeably, as some operations that are performed relative to an ad may also be performed relative to an ad group, and vice versa.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, review, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems. In some embodiment, some content providers 102 review online content items using, for example, systems 112 and/or security CMS 106.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, telephone calls (e.g., substituting a phone number), or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the security CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the security CMS 106 and may be combined with a publication for display to users 150, 152, and 154. In some examples, the publishers 104 may retrieve a publication for display on a particular user access device 108 and then forward the publication to the user access device 108 along with code that causes content from the security CMS 106 to be displayed to the user 150, 152, or 154. In other examples, the publishers 104 may retrieve a publication, retrieve relevant content (e.g., from the security CMS 106 or the content providers 102), and then integrate the content and the publication to form a page for display to the user 150, 152, or 154. In still other examples, the publishers 104 may provide online content space for sale to advertisers, such as content providers 102. Such content space may be populated with content items from the content providers 102, and may be presented to the user 150, 152, or 154 along with the publications.

As noted above, one or more of the publishers 104 may represent a publication network. In such an implementation, the content providers 102 may be able to present content to users through this publication network. Further, in some embodiments, content providers 102 bid on online content items, for example, through security CMS 106.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information. Additionally, in some embodiments, publishers 104 and/or content providers 102 may review online content items using, for example, system 114 and/or security CMS 106.

The security CMS 106 manages content and provides various services to the content providers 102, the publishers 104, and the user access devices 108. The security CMS 106 may store content in a content repository 126 and facilitate the distribution or selective provision and recommendation of content through the environment 100 to the user access devices 108.

The security CMS 106 may include one or more data processing systems 116, such as servers or embedded systems, coupled to the network 110. It can also include one or more processes, such as server processes. In the example embodiment, the security CMS 106 includes a content serving system 120 and a security module 118. The content serving system 120 may include one or more data processing systems 116 and may perform functionality associated with delivering content to publishers or user access devices 108. The ad serving systems 120 may include one or more data processing systems 116 and may perform functionality associated with identifying relevant content to deliver, processing various rules, performing filtering processes, generating reports, maintaining accounts and usage information, auctioning online content items, and other backend system processing. The security CMS 106 operates with security module 118 and the content serving system 120 to mask or replace actual device data (e.g., actual IP addresses) of user access devices 108 with substitute device data (e.g., pseudo-IP addresses) when providing data to the content providers 102 during bidding and/or content serving.

The security CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query. Searching modules may also store search results including one or more of search query terms, search results elements, and ads impressions served.

The security CMS 106 may include one or more interface or frontend modules for providing the various features to content providers, publishers, and user access devices. For example, the security CMS 106 may provide one or more publisher front-end interfaces (PFEs) for allowing publishers to interact with the security CMS 106. The security CMS 106 may also provide one or more content provider front-end interfaces (CPFEs) for allowing content providers to interact with the security CMS 106. In some examples, the front-end interfaces may be configured as web applications that provide users with network access to features available in the security CMS 106.

The security CMS 106 provides various content management features to the content providers 102. The security CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, and review content items as described herein.

The security CMS 106 may allow the content providers 102 to create content and input keywords for which the content will appear. In some examples, the security CMS 106 may provide content to user access devices or publishers when keywords associated with that content are included in a user request or a requested publication. The security CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The security CMS 106 may also allow the content providers 102 to view information about content impressions, which may be maintained by the security CMS 106. The security CMS 106 may be configured to determine and maintain the number of content impressions relative to a particular website or keyword. The security CMS 106 may also determine and maintain the number of click-through's for content as well as the ratio of click-through's to impressions.

The security CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The security CMS 106 may store conversion data and other information in a conversion data repository 136.

The security CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The security CMS 106 may provide various features to the publishers 104. The security CMS 106 may deliver content (associated with the content providers 102) to the user access devices 108 when users access publications from the publishers 104. The security CMS 106 can be configured to deliver content that is relevant to publisher sites, publications, and publisher audiences.

In some examples, the security CMS 106 may crawl publications provided by the publishers 104 and deliver content that is relevant to publisher sites, publications and publisher audiences based on the crawled publications. The security CMS 106 may also selectively recommend and/or provide content based on user information and behavior, such as particular search queries performed on a search engine website. In some examples, the security CMS 106 can add search to a publisher site and deliver content configured to provide appropriate and relevant content relative to search results generated by requests from visitors of the publisher site. A combination of these and other approaches can be used to deliver relevant content.

The security CMS 106 may allow the publishers 104 to search and select specific products and services as well as associated content to be displayed with publications provided by the publishers 104. For example, the publishers 104 may search through content in the content repository 126 and select certain content for display with their publications.

The security CMS 106 may be configured to selectively recommend and provide content created by the content providers 102 to the user access devices 108 directly or through the publishers 104. The security CMS 106 may selectively recommend and provide content to a particular publisher 104 (as described in further detail herein) or a requesting user access device 108 when a user requests search results or loads a publication from the publisher 104.

In some implementations, the security CMS 106 may manage and process financial transactions among and between elements in the environment 100. For example, the security CMS 106 may credit accounts associated with the publishers 104 and debit accounts of the content providers 102. These and other transactions may be based on conversion data, impressions information and/or click-through rates received and maintained by the security CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single security CMS 106 and may include any number of integrated or distributed security CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

In some embodiments, the security CMS 106 provides data associated with user access devices 108 and/or users 150, 152, and 154 to content providers 102. At least some content providers 102 may use this data to determine whether or not to provide certain online content (e.g., ads) to particular user devices. To protect aspects of user privacy, the security CMS 106 may provide substitute data to content providers 102 (e.g., real-time bidders). Further, security CMS 106 may select substitute data that matches characteristics of the actual data associated with user access devices 108. As used herein, the term "actual data" and "actual device data" refers to authentic data associated with users or their devices (e.g., user access devices 108 and/or users 150, 152, and 154). For example, user access device 108 may be using an actual IP address of 12.34.56.78 for communications on the Internet (e.g., either directly or through, e.g., IP masking of a perimeter device). As used herein, the term "substitute data" and "substitute device data" refers to data that is generated (or selected, or otherwise determined) and provided to other parties ("third parties", e.g., by security CMS 106 to content providers 102) in lieu of actual data of the user or their device. For example, security CMS 106 may generate a substitute IP address for that same user access device 108 as 12.34.56.90, and may provide this substitute IP address to content providers 102 rather than the actual IP address of 12.34.56.78. Content providers 102 may use this substitute data to, for example, infer or deduce geo-location data about user access device 108 during a bidding auction for online content. User privacy may be enhanced by providing substitute data instead of actual data. Further, content providers may still infer or deduce data from the substitute data if that substitute data is carefully selected or determined. Selection of substitute data is described in greater detail below in reference to FIG. 3.

Figure 2:
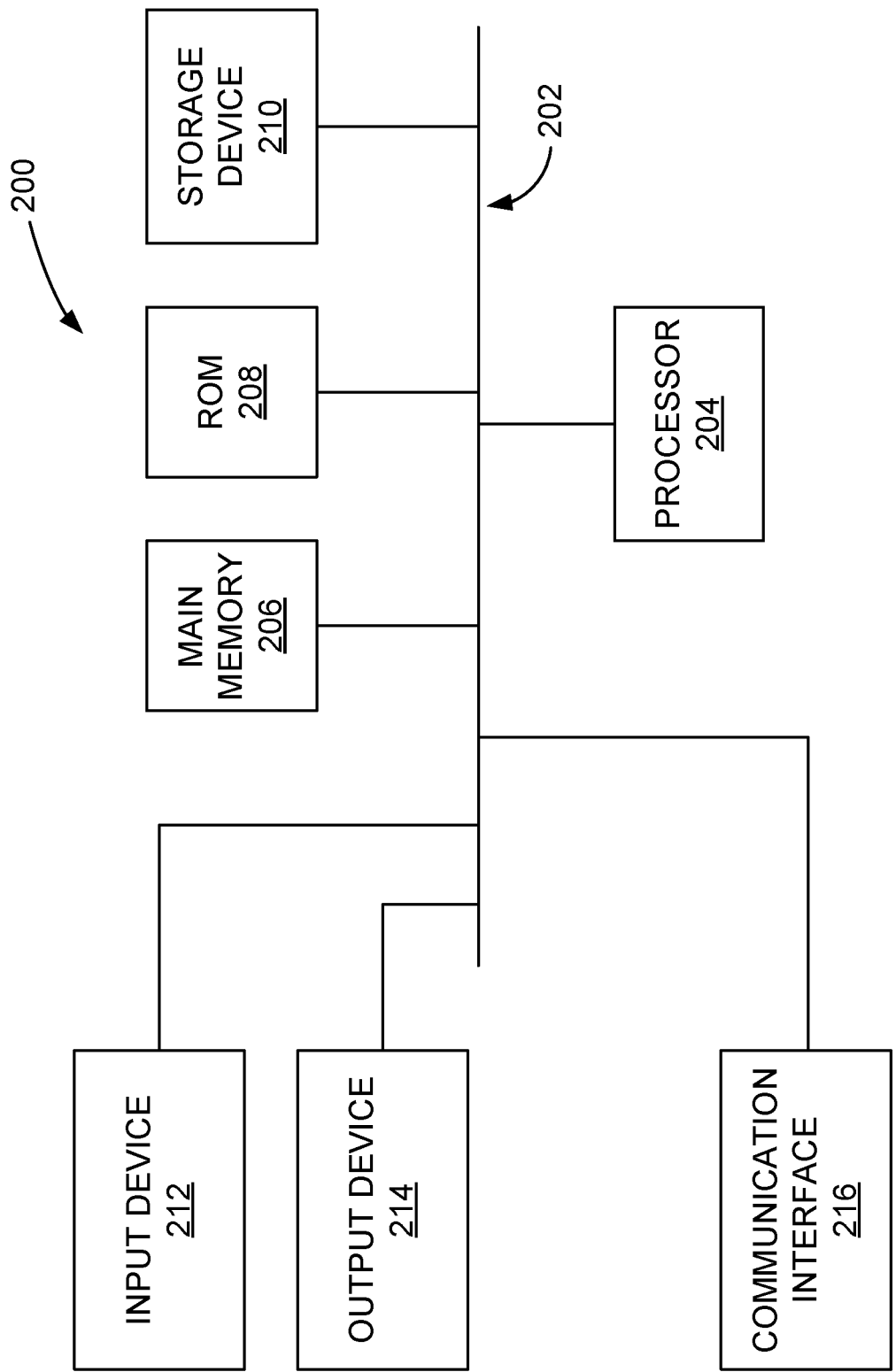

FIG. 2 is a block diagram of a computing device 200 that may be used for enabling privacy protection features while providing online content to users in networked environment 100 (shown in FIG. 1). In the example embodiment, computing device could be any of the computing devices shown in FIG. 1, such as, for example, user access device 108 (shown in FIG. 1) or security CMS 106. FIG. 2 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, tablet computers, digital e-book readers, and other similar computing devices that could be used for displaying publications and/or content items to a user. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 2), wherein it is specifically configured to perform one or more of the steps described herein. In the example embodiment, computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system). In some embodiments, processor 204 is transformed into a special purpose microprocessor by executing computer-executable instructions or by otherwise being programmed.

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or cloud-based storage or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates enabling privacy protection features while providing online content to users. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, Wi-Fi, or other such transceiver (not shown). In addition, a GPS (Global Positioning system) receiver module may provide additional navigation- and location-related wireless data to device 200, which may be used as appropriate by applications running on device 200.

Computing device 200 may also communicate audibly using an audio codec, which may receive spoken information from a user and convert it to usable digital information. The audio codec may likewise generate audible sound for a user, such as through a speaker, e.g., in a handset of device. Such sound may include sound from voice telephone calls, may include recorded sound (e.g., voice messages, music files, etc.) and may also include sound generated by applications operating on computing device 200.

Computing device 200 may be implemented in a number of different forms. For example, it may be implemented as a cellular telephone, or as part of a smart phone, personal digital assistant, a computer tablet, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 200) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing device 200 is a system such as security module 118 (shown in FIG. 1), and is configured to provide substitute device data to online content providers during auctions for online content.

Figure 3:
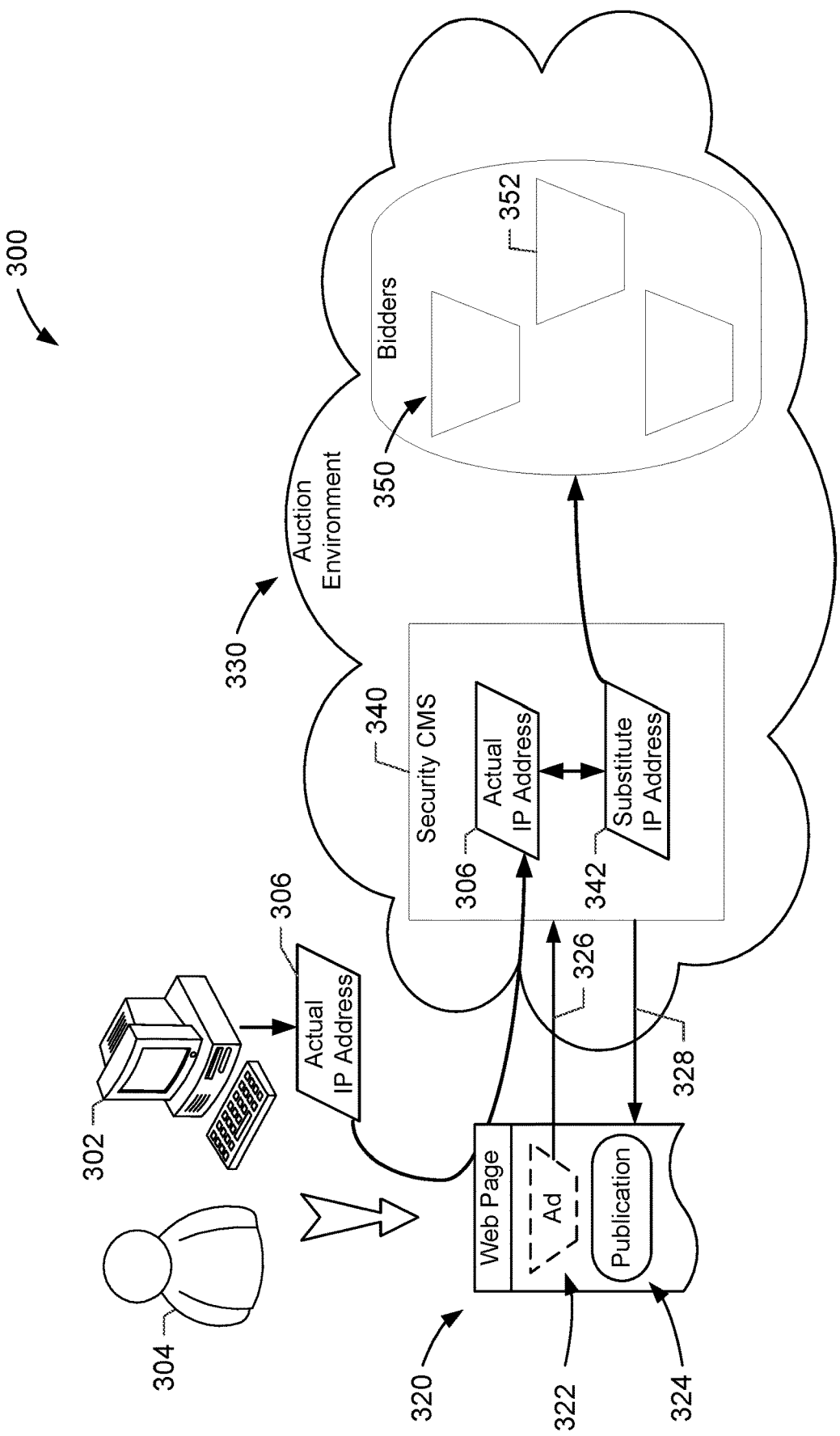

FIG. 3 is a diagram showing an example environment 300 in which an online user 304 of a computing device 302 generates a request for online content. In some embodiments, environment 300 may be networked environment 100 (shown in FIG. 1), user 304 may be user 150, 152, or 154 (shown in FIG. 1), and device 302 may be user access device 108 (shown in FIG. 1). Further, in some embodiments, device 302 may be similar to computing device 200 (shown in FIG. 2).

In the example embodiment, computing device 302 requests a web page 320 that includes a publication 324 and one or more online content items (e.g., ads 322). At least one ad 322 is a dynamic content area on web page 320 that generates an ad request 326 to an auction environment 330 to provide the ad that will be populated into web page 320 for presentation to user 304. In other embodiments, the ad request 326 may be generated in other online environments such as, for example, in an online video presentation environment. Further, in some embodiments, ad request 326 may not be associated, either solely or in part, with online advertisements. For example, presume web page 320 is an airline booking service that displays weather content from a third party within web page 320 (e.g., similar to ad 322) based on a present location of user 304. As such, actual IP address 306 may also be masked by an intervening system similar to security CMS 340 by similarly sending a substitute IP address 342 to the third party in lieu of actual IP address 306.

Auction environment 330, in the example embodiment, is managed, at least in part, by a security content management system (CMS) 340. In some embodiments, security CMS 340 may be security CMS 106 (shown in FIG. 1). Security CMS 340 enables one or more bidders 350 (e.g., real-time bidders, or "RTB's") to participate in an auction for ad request 326 (e.g., in a competition to provide an online content item in response to ad request 326). In other words, and for example, bidders 350 may compete to be the online content provider that will provide an online content item (e.g., ad 322) to be presented to the viewing user (e.g., user 304). As used herein, the term "auction" refers to a competition between one or more online content providers (e.g., bidders 350), the winner of which is allowed to provide an online content item (e.g., an ad 322) for display or presentation to the computing device (e.g., device 302) of a user (e.g., user 304). Generally speaking, security CMS 340 may similarly protect user privacy in this respect in situations where a publisher relies on third party content providers to provide part of the content.

In the example embodiment, security CMS 340 receives or otherwise has access to an actual IP address 306 of computing device 302 that is associated with ad request 326. Actual IP address 306 is an example of actual data associated with computing device 302. In some embodiments, actual IP address 306 may be an IP address configured on a network adapter (e.g., communication interface 216 (shown in FIG. 2)) of computing device 302. For example, computing device 302 may be a mobile phone connected to a local area network via a Wi-Fi network which has assigned an unique Internet IP of 12.34.56.78 to computing device 302. In the example embodiment, actual IP address 306 and substitute IP address 342 are one of a complete IP version 4 (IPv4) address and a complete IP version 6 (IPv6) address.

In other embodiments, actual IP address 306 may be an IP address that has been IP masked through, for example, the Wi-Fi network router. For example, a Wi-Fi router may maintain a private sub-network such as 192.168.0.xx for locally connecting devices such as the mobile phone, and may hand out an IP address to computing device 302 (e.g., the mobile phone) on that private subnet. To enable computing device 302 and potentially other devices connected to the private subnet, the network router may maintain a single Internet-facing IP address with which the router uses for communicating all traffic to and from the Internet. As is commonly known, IP masking converts source or destination IP addresses in IP packets from one network address (e.g., an address on the private subnet 192.168.0.xx) to another network address (e.g., a unique Internet-facing IP address). In such scenarios, and as used herein, the "actual IP address" of computing device 302 would not be the private, non-masked 192.168.0.xx address (the IP address configured on computing device 302 itself), but would instead be the Internet-facing IP address to which that private IP address was masked (e.g., the Internet-facing IP address of the network router).

Some bidders 350 may use an IP address associated with the device of the viewing user (e.g., computing device 302) to attempt to infer, deduce, or otherwise determine information about actual data (actual device data) or substitute data (substitute device data) associated with device 302 and/or user 304. As used herein, the term "characteristic" or "attribute" is used to refer to data about device 302 and/or user 304. A characteristic may be discussed herein as having a "characteristic type" and a "characteristic value", where the characteristic type describes the type of information conveyed by the characteristic, and the characteristic value is the actual data value for that characteristic. For example, one element of actual data (actual device data) is an actual IP address 306 of device 302, and one or more characteristics (characteristic types) may be inferred from that actual IP address 306. Geo-location is one example of a characteristic type that may be inferred from actual IP address 306, and the characteristic value may be, for example, "Palo Alto, Calif." Also as used herein, the phrase "inferring a characteristic" is used generally to indicate any method of determining the characteristic from another element of data (e.g., an IP address). Device data (actual or substitute) may be described herein as "having" or "including" these characteristics that are inferred from the device data. In some embodiments, inferring a characteristic may not be guaranteed to be an accurate inference. In other words, the inference may be an incorrect inference, though still an inference. In the example embodiment, inferences are presumed to be correct.

One characteristic that bidders 350 may infer from IP addresses, for example, may be a geo-location associated with an IP address. At least some IP addresses may be attributable to a particular country, state, city, region, zip code, latitude, longitude, elevation, time zone, or other geographical area information. Other information that may also be available to bidders 350 through IP addresses is an internet service provider (ISP), company, organization, or end user associated with the IP address, and perhaps a phone number and/or a postal mail address. Such data is publicly or commercially available on the Internet through a variety of IP address geo-location databases and services, or through various Internet-based databases and/or services such as whois. Another characteristic that may be available through an IP address is a mobile carrier (e.g., cellphone service provider). Still another characteristic that may be available through an IP address is a connectivity type (e.g., DSL, 3G, 4G, broadband, adsl, public Wi-Fi) and/or connection speed (e.g., a bandwidth rate such as 10 megabits per second) of the associated computing device, which may, for example, indicate the network bandwidth capacity of computing device 302, and thus the suitability of certain ads (e.g., more- or less-bandwidth-intensive). Yet another characteristic that may be available is a short-term identity (e.g., user used this IP a minute ago, thus is probably the same user now too).

In some situations, multiple devices may "share" a single IP address (e.g., IP masking by a household router). In the example embodiment, the multiple devices' single IP address (i.e., actual IP address) is masked to the same substitute IP address. In some embodiments, advertisers may recognize the multiple devices utilizing the substitute IP address and, as such, may perform re-marketing across the multiple devices. Further, in some embodiments, advertisers may recognize similar browsing patterns from the multiple devices behind the single shared IP address. For example, presume the shared IP address is from a public Wi-Fi access point at an airport. Advertisers may notice a common browsing pattern of, for example, tour information in Europe. As such, advertisers may serve any new device, or all devices sharing the substitute IP address, with similar content.

The ability to infer characteristics from an actual IP address may present privacy concerns to at least some users. As such, and generally speaking, security CMS 340 acts as a masking proxy device to protect actual IP address 306 of the user's 304 device 302. More specifically, security CMS 340 receives actual IP address 306 (e.g., as a part of ad request 326), determines one or more characteristics of actual IP address 306, generates a substitute IP address 342 sharing those one or more characteristics, and provides substitute IP address 342 to bidders 350.

In order to facilitate bidders' 350 inferences from IP addresses, in the example embodiment, security CMS 340 generates a particular substitute IP address that is similar to and/or approximately matches at least one characteristic of actual IP address 306. For example, and using just a single characteristic, presume actual IP address 306 is the IP address 12.34.56.78, and also presume that IP address 12.34.56.78 is associated with a zip code of 94301. In one embodiment, security CMS 340 may select a substitute IP address that also is associated with the zip code of 94301.

In some embodiments, security CMS 340 may communicate with one or more third-party information sources (not shown) that provide characteristic information for IP addresses. Further, in some embodiments, security CMS 340 may maintain a pool of IP addresses sharing one or more characteristics, or a database of IP addresses and associated characteristics from which security CMS 340 may generate matching substitute IP addresses based on one or more characteristics. For example, presume the example IP address from above, 12.34.56.78, is also associated with a connectivity speed of "DSL". Security CMS 340, in some embodiments, may match actual IP address 306 on a plurality of characteristics, such as zip code and connectivity speed. As such, security CMS 340 may select substitute IP address 342 as 12.34.56.90 if this IP address is associated with both the zip code of 12.34.56.78 (e.g., zip code of 94301) as well as connectivity speed of "DSL".

As such, security CMS 340 may generate a substitute IP address 342 that shares a set of one or more characteristics with actual IP address 306. During operation, in the example embodiment, bidders 350 receive substitute IP address 342 from security CMS 340 and subsequently infer characteristic information from substitute IP address 342. Because substitute IP address 342 was selected, by security CMS 340, to share one or more characteristics with actual IP address 306, bidders 350 may be able to infer the same information from substitute IP address 342 as they would have from actual IP address 306. Accordingly, bidders 350 may still value their bids based on similar information, thus allowing a more meaningful participation in content presentation while hiding actual IP address 306 of computing device 302 from bidders 350, thereby enhancing privacy of user 304.

In some embodiments, bidders 350 may configure one or more characteristics of interest. More specifically, an individual bidder 352 may specify, to security CMS 340, one or more characteristics of interest. During a determination of a substitute IP address 342 for computing device 302, security CMS 340 uses the one or more characteristics of interest as the characteristics on which to match substitute IP address 342 with actual IP address 306. From the above example, presume an individual bidder 352 indicates the characteristics of interest zip code and connectivity speed. As such, security CMS 340 selects a particular substitute IP address 342 that shares both zip code 94301 and connectivity speed of "DSL", without regard for or consideration of other characteristics of either actual IP address 306 or the particular substitute IP address 342. In other words, substitute IP address 342 matches the two characteristics identified by bidder 352, but may or may not match on any other characteristics.

In some embodiments, bidders 350 may provide a plurality of characteristics along with an associated hierarchy of importance of characteristics. In such embodiments, if security CMS 340 is unable to identify a substitute IP address 342 that matches all identified characteristics, security CMS 340 may select a substitute IP address 342 that matches on less than all of the identified characteristics. Security CMS 340 may use the provided hierarchy to determine which characteristics to exclude and/or include when less than all characteristics can be matched. In other embodiments, bidders 350 may provide relative scoring values for each characteristic of interest, and security CMS 340 may select a substitute IP address having a subset of characteristics of interest that scores the highest. Accordingly, bidders may be able to configure which characteristics are of most importance to their valuation and/or bidding.

Further, in some embodiments, security CMS 340 maintains a mapping of the actual device data (e.g., actual IP address 306) and the substitute data that was selected (e.g., substitute IP address 342). As such, security CMS 340 may provide the same substitute data (e.g., the same substitute IP address) to bidders 350 during later auctions. This allows individual bidders 352 to uniquely identify devices (e.g., device 302) for some period of time, though still without the actual device data. In some embodiments, the mapping may be common across multiple bidders 350 such that multiple bidders 350 receive the same substitute IP address for same user. In other embodiments, the mapping may be unique to individual bidders 352 such that each bidder may receive a different IP address for the same user.

In some embodiments, security CMS 340 deletes the mapping between actual device data and substitute device data (e.g., between actual IP address 306 and substitute IP address 342). In other words, after removal of the prior mapping, substitute IP address will be released (perhaps for reuse for another mapping), and actual IP address 306 will need a new substitute IP address (i.e., a new mapping). As such, and similar to when originally established, security CMS 340 selects (re-maps) new substitute data (e.g., a new, different substitute IP addresses) for the actual device data (e.g., actual IP address 306). In some embodiments, security CMS 340 removes mappings on some pre-determined basis, such as daily, weekly, or monthly. Periodic removal of mappings between actual device data and substitute device data, and the subsequent re-establishing of a different mapping between actual device data and different substitute device data prevents third party content providers (e.g., advertisers 350) from tracking devices over longer periods of time, which serves to further enhance security and alleviate at least some privacy concerns.

In other embodiments, security CMS 340 may not maintain a mapping between actual device data and substitute device data, but may deterministically compute or otherwise determine the same substitute device data from the actual device data. For example, in one embodiment, CMS 340 may hash a combination of actual IP address 306 with a key (not shown) to determine substitute IP address 342. As such, each time a new request 326 is generated involving actual IP address 306, the same substitute IP address 342 is generated because the key is the same. In some embodiments, the key is periodically changed to cause a re-mapping of actual device data to substitute device data, enabling some of the same security benefits as described above relating to deleting mappings.

In some embodiments, CMS 340 operates not in an auction environment. CMS 340 may perform substitute device data (e.g., substitute IP address 342) in other settings in which a publisher relies on a third party content provider to provide some content. For example, the publisher may work exclusively with one third party content provider and, as such, no auction is performed, though CMS 340 may still mask actual device data with substitute device data when providing data to the third party. Further, in some embodiments, CMS 340 may operate in forums other than web content. For example, CMS 340 may receive requests for online content from third party content providers within audio streams (e.g., online radio program with ads or customized music streaming where music providers may provide the next song based on multiple parameters such as a listener profile derived from location, IP, and historical data), in-app ads (e.g., in-game advertisements), or customized content recommendation. Also, in some embodiments, CMS 340 may operate on other actual device data such as, for example, a media access control (MAC) address of a user's device or router, a service set identifier (SSID) of a wireless access point, a user identifier (e.g., a cookie on the user's device, which may include characteristics such as age, gender, education, or other personal user characteristics that may be masked via substitute device data), or a phone number.

Figure 4:
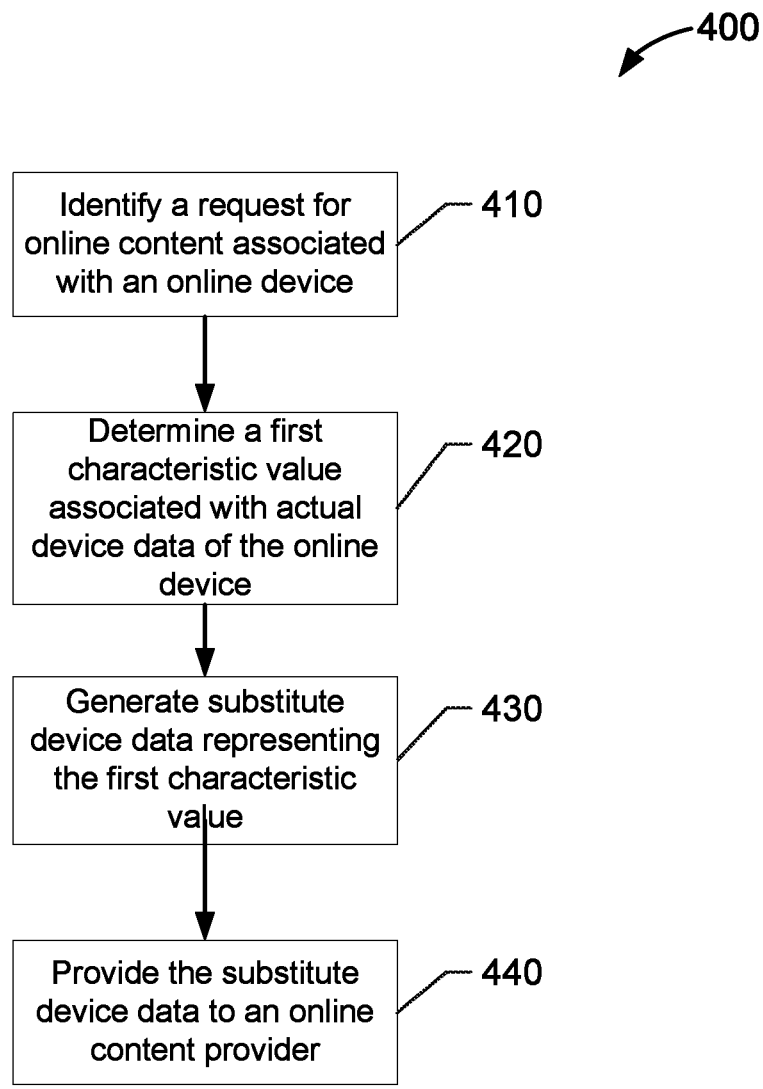

FIG. 4 is an example method 400 for protecting user identity within online content providing environments (e.g., online advertising). In the example embodiment, method 400 is a computer-implemented method practiced in environment 100 (shown in FIG. 1) using one or more computing devices such as user access devices 108 (shown in FIG. 1), ad serving system 120 (shown in FIG. 1), content provider system 112 (shown in FIG. 1), publisher system 114, and/or computing device 404 (shown in FIG. 4), and includes at least one processor and a memory.

In the example embodiment, method 400 includes identifying 410 a request for an online content item associated with an online device, wherein the online device is associated with actual device data. Method 400 also includes determining 420 a first characteristic value associated with the actual device data of the online device. In some embodiments, method 400 includes receiving, from the online content provider, identification of a first characteristic type (e.g., city) used by the online content provider, wherein the first characteristic type identifies a characteristic type which the substitute device data is to share with the actual device data (e.g., the advertiser desires to infer "city" from the provided IP address). Further, determining 420 a first characteristic value includes determining a first characteristic value for the first characteristic type (e.g., city="Palo Alto, Calif."). In some embodiments, determining 420 a first characteristic of the actual device data includes determining the first characteristic having a characteristic type of one of (i) geo-location of the actual device data, (ii) internet service provider associated with the actual device data, and (iii) a connection characteristic associated with the actual device data.

Method 400, in the example embodiment, also includes generating 430, by the processor, substitute device data, wherein the substitute device data represents at least the first characteristic value. In some embodiments, the actual device data includes at least an actual internet protocol (IP) address associated with the online device, and generating 430 substitute device data further includes selecting a substitute IP address. In some embodiments, the substitute IP address is one of a complete IP version 4 (IPv4) address and a complete IP version 6 (IPv6) address. In some embodiments, generating 430 substitute device data includes identifying a pool of substitute device data having the first characteristic, and selecting a random substitute device data from the pool of substitute device data, thereby generating the substitute device data.

In the example embodiment, method 400 also includes providing 440 the substitute device data to an online content provider. In some embodiments, the online content item is an online advertisement, the online content provider is a real-time bidder in an auction associated with the request, and providing 440 the substitute device data includes providing the substitute device data during the auction.

In some embodiments, method 400 also includes one or more of storing, in the memory, a mapping of the actual device data to the substitute device data, identifying another request for another online content item involving a later online content provider and the online user, identifying, from the memory, the substitute device data based at least in part on the actual device data, and providing the substitute device data to the later online content provider in response to the other request. In some embodiments, method 400 also includes one or more of determining that a pre-determined expiration time has elapsed since storing the mapping, and deleting the mapping of the actual device data to the substitute device data.

Figure 5:
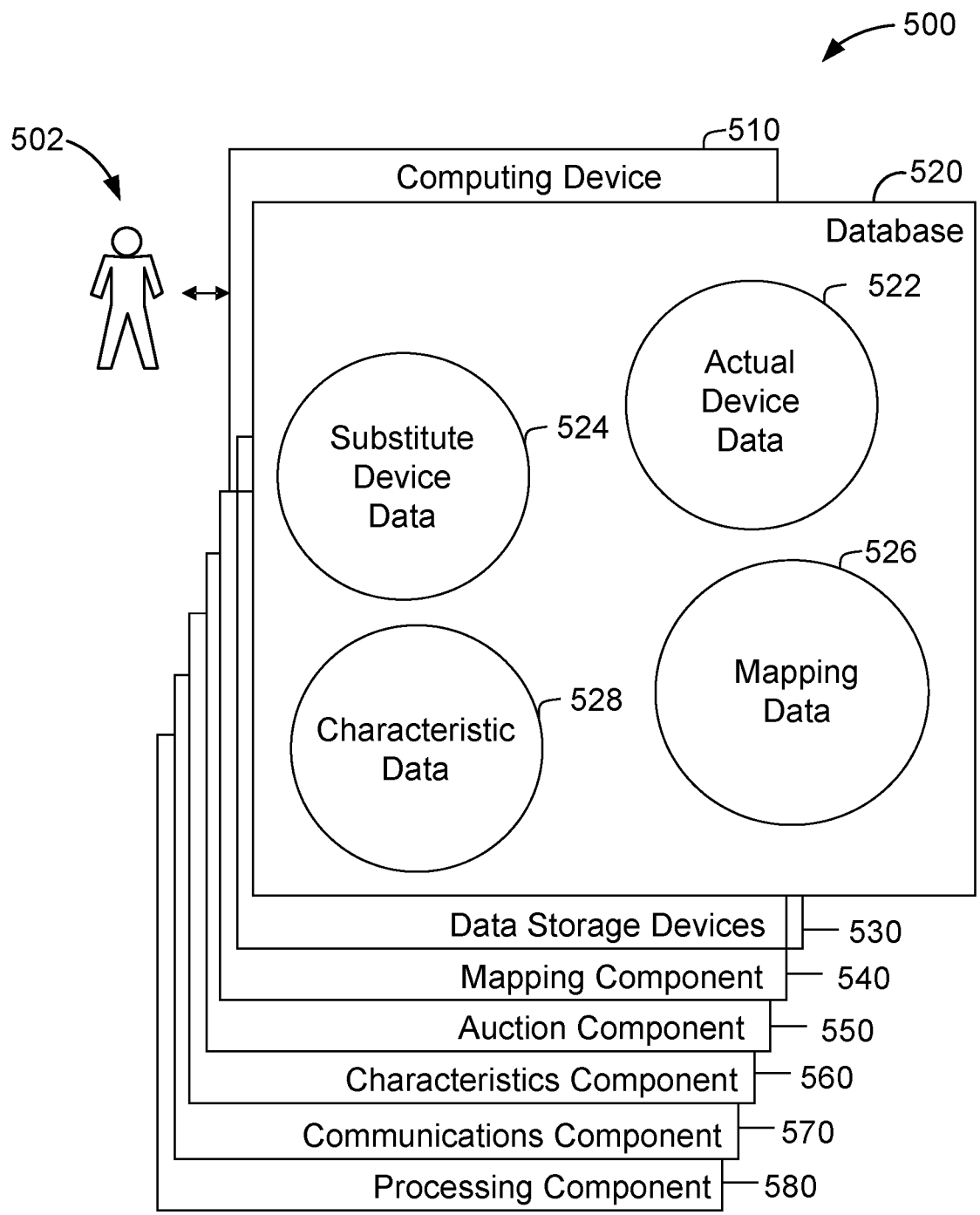

FIG. 5 shows an example configuration 500 of a database 520 within a computing device 510, along with other related computing components, that may be used to protect user identity within online content providing environments. Computing device 510 may operate in a networked environment such as environment 100 (shown in FIG. 1). In some embodiments, computing device 510 is similar to user access devices 108 (shown in FIG. 1), ad serving system 120 (shown in FIG. 1), content provider system 112 (shown in FIG. 1), publisher system 114, and/or computing device 302 (shown in FIG. 3). Database 520 is coupled to several separate components within computing device 510, which perform specific tasks.

In the example embodiment, database 520 includes actual device data 522, substitute device data 524, mapping data 526, and characteristic data 528. Actual device data 522 includes information associated with user computing devices, such as actual IP address 306 of computing device 302 (both shown in FIG. 3). Substitute device data 524 includes information associated with substitute data provided to online content providers, such as substitute IP address 342 (shown in FIG. 3). Mapping data 526 includes data associating actual device data 522 with substitute device data 524. Characteristic data 528 includes data associated with online content providers' configuration preferences for which actual device data they use during the bidding process.

Computing device 510 includes the database 520, as well as data storage devices 530. Computing device 510 also includes a mapping component 540 for determining substitute device data for given actual device data and for persistent mapping of such data. Computing device 510 also includes an auction component 550 for communicating substitute device data to bidders during an online auction. Computing device 510 also includes a characteristics component 560 for determining characteristics of actual device data and/or substitute device data. A communications component 570 is also included for communicating with other servers or entities during operation. A processing component 580 assists with execution of computer-executable instructions associated with the system.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the embodiments or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing"

or "computing" or "calculating" or "determining" or "displaying" or "providing" "retrieving" "receiving" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

While the disclosure has been described in terms of various specific embodiments, it will be recognized that the disclosure can be practiced with modification within the spirit and scope of the claims.

What is claimed is:

1. A computer-implemented method for protecting user identity within online content providing environments, said method comprising:
    identifying a request for an online content item associated with an online device, wherein the request includes actual device data for the online device, wherein the actual device data includes actual values representing actual characteristics of the online device for a plurality of characteristic types;
    identifying a particular characteristic type of the plurality of characteristic types utilized by a particular online content provider;
    analyzing the actual device data to identify the actual value representing the actual characteristic of the online device for the particular characteristic type utilized by the particular online content provider;
    generating a substitute value that also represents the actual characteristic of the online device for the particular characteristic type utilized by the particular online content provider, wherein the substitute value is different than the actual value contained in the actual device data from the request; and
    providing the substitute value to the particular online content provider in place of the actual value to convey, without revealing the actual value, the actual characteristic of the online device for the particular characteristic type utilized by the particular online content provider.

2. The method of claim 1, wherein the actual device data includes at least an actual internet protocol (IP) address associated with the online device, wherein generating the substitute value includes obtaining a substitute IP address.

3. The method of claim 2, wherein the substitute IP address is one of a complete IP version 4 (IPv4) address or a complete IP version 6 (IPv6) address.

4. The method of claim 1, wherein the online content item is an online advertisement, wherein the particular online content provider is a real-time bidder in an auction associated with the request, wherein providing the substitute value includes providing the substitute value during the auction.

5. The method of claim 1, wherein analyzing the actual device data to identify the actual value representing the actual characteristic of the online device for the particular characteristic type includes determining a portion of the actual device data that identifies one of (i) a geo-location of the online device, (ii) an internet service provider associated with the online device, or (iii) a connection characteristic.

6. The method of claim 1, further comprising:
    storing, in a memory, a mapping of the actual device data to substitute device data;
    identifying a later request for another online content item involving the online device;
    identifying, from the memory, the substitute device data based at least in part on the actual device data; and
    providing the substitute device data to a later online content provider in response to the later request.

7. The method of claim 6, further comprising:
    determining that a pre-determined expiration time has elapsed since storing the mapping; and
    deleting the mapping of the actual device data to the substitute device data.

8. The method of claim 1, wherein generating the substitute value further includes:
    identifying a pool of substitute values that all represent the actual characteristic for the particular characteristic type; and
    selecting a random substitute value from the pool of substitute values, thereby generating the substitute value.

9. A non-transitory computer-readable medium having instructions stored thereon that, when executed by a processor, causes the processor to perform operations comprising:
    identifying a request for an online content item associated with an online device, wherein the request includes actual device data for the online device, wherein the actual device data includes actual values representing actual characteristics of the online device for a plurality of characteristic types;
    identifying a particular characteristic type of the plurality of characteristic types utilized by a particular online content provider;
    analyzing the actual device data to identify the actual value representing the actual characteristic of the online device for the particular characteristic type utilized by the particular online content provider;

generating a substitute value that also represents the actual characteristic of the online device for the particular characteristic type utilized by the particular online content provider, wherein the substitute value is different than the actual value contained in the actual device data from the request; and providing the substitute value to the particular online content provider in place of the actual value to convey, without revealing the actual value, the actual characteristic of the online device for the particular characteristic type utilized by the particular online content provider.

10. The non-transitory computer-readable medium of claim 9, wherein the actual device data includes at least an actual internet protocol (IP) address associated with the online device, wherein generating the substitute value includes obtaining a substitute IP address.

11. The non-transitory computer-readable medium of claim 10, wherein the substitute IP address is one of a complete IP version 4 (IPv4) address or a complete IP version 6 (IPv6) address.

12. The non-transitory computer-readable medium of claim 9, wherein the online content item is an online advertisement, wherein the particular online content provider is a real-time bidder in an auction associated with the request, wherein providing the substitute value includes providing the substitute value during the auction.

13. The non-transitory computer-readable medium of claim 9, wherein analyzing the actual device data to identify the actual value representing the actual characteristic of the online device for the particular characteristic type includes determining a portion of the actual device data that identifies one of (i) a geo-location of the online device, (ii) an internet service provider associated with the online device, or (iii) a connection characteristic.

14. The non-transitory computer-readable medium of claim 9, wherein the operations further comprise:
storing, in a memory, a mapping of the actual device data to substitute device data;
identifying a later request for another online content item involving the online device;
identifying, from the memory, the substitute device data based at least in part on the actual device data; and
providing the substitute device data to a later online content provider in response to the later request.

15. The non-transitory computer-readable medium of claim 14, wherein the operations further comprise:
determining that a pre-determined expiration time has elapsed since storing the mapping; and
deleting the mapping of the actual device data to the substitute device data.

16. The non-transitory computer-readable medium of claim 9, wherein generating the substitute value further includes:

identifying a pool of substitute values that all represent the actual characteristic for the particular characteristic type; and
selecting a random substitute value from the pool of substitute values, thereby generating the substitute value.

17. A system, comprising:
a processor; and
a non-transitory computer-readable medium having instructions stored thereon that, when executed by a processor, causes the processor to perform operations comprising:
identifying a request for an online content item associated with an online device, wherein the request includes actual device data for the online device, wherein the actual device data includes actual values representing actual characteristics of the online device for a plurality of characteristic types;
identifying a particular characteristic type of the plurality of characteristic types utilized by a particular online content provider;
analyzing the actual device data to identify the actual value representing the actual characteristic of the online device for the particular characteristic type utilized by the particular online content provider;
generating a substitute value that also represents the actual characteristic of the online device for the particular characteristic type utilized by the particular online content provider, wherein the substitute value is different than the actual value contained in the actual device data from the request; and
providing the substitute value to the particular online content provider in place of the actual value to convey, without revealing the actual value, the actual characteristic of the online device for the particular characteristic type utilized by the particular online content provider.

18. The system of claim 9, wherein the actual device data includes at least an actual internet protocol (IP) address associated with the online device, wherein generating the substitute value includes obtaining a substitute IP address.

19. The method of claim 1, wherein analyzing the actual device data to identify the actual value representing the actual characteristic of the online device for the particular characteristic type utilized by the particular online content provider comprises identifying an IP address of the online device that represents a geographic region of the online device,
wherein the substitute value is a substitute IP address that represents the same geographic region.

* * * * *